(12) United States Patent
Tanimura et al.

(10) Patent No.: US 12,015,312 B2
(45) Date of Patent: Jun. 18, 2024

(54) MOTOR CONTROLLER, MOTOR AND PUMP DEVICE

(71) Applicant: NIDEC SANKYO CORPORATION, Nagano (JP)

(72) Inventors: Satoshi Tanimura, Nagano (JP); Takashi Yamamoto, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 200 days.

(21) Appl. No.: 17/692,213

(22) Filed: Mar. 11, 2022

(65) Prior Publication Data

US 2022/0302800 A1   Sep. 22, 2022

(30) Foreign Application Priority Data

Mar. 16, 2021  (JP) .................. 2021-041938

(51) Int. Cl.
  *H02K 11/33*  (2016.01)
  *F04D 25/06*  (2006.01)
  *F04D 29/40*  (2006.01)
  *H02P 1/44*  (2006.01)

(52) U.S. Cl.
  CPC ............. *H02K 11/33* (2016.01); *F04D 25/06* (2013.01); *F04D 29/40* (2013.01); *H02P 1/44* (2013.01)

(58) Field of Classification Search
  CPC ......... H02K 11/33; F04D 25/06; F04D 29/40; F04D 13/06; F04D 29/669; F04D 15/0066; H02P 1/44; H02P 27/06; H02M 1/44; H02M 7/48

USPC ................ 318/795, 794, 781, 778, 767, 727
See application file for complete search history.

(56) References Cited

U.S. PATENT DOCUMENTS

| 4,511,834 A * | 4/1985 | Studtmann ............. H02P 25/024 318/722 |
| 5,661,390 A * | 8/1997 | Lipo ........................ H02M 1/12 318/803 |
| 7,855,527 B2 * | 12/2010 | Goto .................... H02M 3/3376 318/474 |
| 8,264,175 B2 * | 9/2012 | Lee ......................... H02M 1/44 324/548 |

(Continued)

FOREIGN PATENT DOCUMENTS

| JP | 2001352792 | 12/2001 |
| JP | 2020159336 | 10/2020 |

*Primary Examiner* — David Luo
(74) *Attorney, Agent, or Firm* — JCIPRNET

(57) ABSTRACT

A motor controller includes a motor control part controlling a motor having a three-phase coil by a control signal, an inverter applying a drive voltage supplied from a power source to the three-phase coil based on an output signal from the motor control part, a drive voltage line supplying the drive voltage to the inverter, a common line electrically connected with a neutral point of the three-phase coil, an inductor electrically connected in series with the drive voltage line, a first capacitor between a portion between the inverter and the inductor in the drive voltage line and a ground, a second capacitor between a portion on an input side with respect to the first capacitor in the drive voltage line and the ground, and a third capacitor between the second capacitor and the ground. The common line is electrically connected between the second capacitor and the third capacitor.

16 Claims, 3 Drawing Sheets

(56) References Cited

U.S. PATENT DOCUMENTS 8,829,826 B2 * 9/2014 Rozman .................... B60L 7/22
323/344

* cited by examiner

FIG. 3A

Capacitance C2 of First Capacitor

| Capacitance C | $47\mu F \leq C2 < 100\mu F$ | $100\mu F \leq C2 \leq 150\mu F$ |
|---|---|---|
| Estimation | ×: Current Ripple is Relatively Large | ○: Noise Reduction Effect is Satisfactory |

FIG. 3B

Capacitance C1 of Second Capacitor and Third Capacitor

| Capacitance C | $0.01\mu F \leq C1 < 0.047\mu F$ | $0.047\mu F \leq C1 \leq 0.33\mu F$ | $0.33\mu F < C1 \leq 0.47\mu F$ |
|---|---|---|---|
| Estimation | ×: Noise Reduction Effect is Relatively Low | ○: Noise Reduction Effect is Satisfactory | ×: Motor Characteristics are Relatively Lowered |

FIG. 3C

Capacitance C3 of Fifth Capacitor

| Capacitance C | $C3 \leq 0.1\mu F$ | $0.1\mu F < C3$ |
|---|---|---|
| Estimation | ○: Noise Reduction Effect is Satisfactory | ×: Output Waveform of Rotation Number Signal Easily becomes Relatively Dull |

MOTOR CONTROLLER, MOTOR AND PUMP DEVICE

CROSS REFERENCE TO RELATED APPLICATION

The present invention claims priority under 35 U.S.C. § 119 to Japanese Application No. 2021-041938 filed Mar. 16, 2021, the entire content of which is incorporated herein by reference.

FIELD OF THE INVENTION

At least an embodiment of the present invention may relate to a motor which is used in a pump device or the like. Further, at least an embodiment of the present invention may relate to a motor controller configured to control the motor.

BACKGROUND

Japanese Patent Laid-Open No. 2020-159336 (Patent Literature 1) discloses a pump device. A pump disclosed in the literature includes a motor, an impeller fixed to a rotor of the motor, and a case which accommodates an impeller and sections a pump chamber. The motor includes a rotor which is turnable with a center axis as a center, and a stator having a three-phase coil.

As a motor for the pump device, a motor provided with a noise countermeasure may be used (see, for example, Japanese Patent Laid-Open No. 2001-352792 (Patent Literature 2)). A motor disclosed in Patent Literature 2 includes a control device having one capacitor which is disposed in parallel between a neutral point of a three-phase coil and a predetermined reference potential. Since the control device includes the capacitor, a voltage of the neutral point is smoothed. As a result, noise generated from the motor is suppressed.

Recently, a pump device has been increasingly used together with another precision apparatus and, when the pump device is used for an application such as an on-vehicle pump, it is further required to suppress noise generated from a motor of the pump device. In this case, a noise countermeasure is not sufficient even when a motor disclosed in Patent Literature 2 is used in the pump device.

SUMMARY

At least an embodiment of the present invention may advantageously provide a motor controller which is capable of suppressing noise generated from a motor. Further, at least an embodiment of the present invention may advantageously provide a motor comprising the motor controller and a pump device comprising the motor.

According to at least an embodiment of the present invention, there may be provided a motor controller which controls a motor having a three-phase coil. The motor controller includes a motor control part which controls rotation of the motor by a control signal, an inverter which applies a drive voltage supplied from a driving power source to the three-phase coil based on an output signal from the motor control part, a drive voltage line which supplies the drive voltage to the inverter, a common line which is electrically connected with a neutral point of the three-phase coil, an inductor which is electrically connected in series with the drive voltage line, a first capacitor which is electrically connected between a portion between the inverter and the inductor in the drive voltage line and the ground, a second capacitor which is electrically connected between a portion on an input side with respect to the first capacitor in the drive voltage line and the ground, and a third capacitor which is electrically connected between the second capacitor and the ground. In the motor controller, the common line is electrically connected between the second capacitor and the third capacitor.

In at least an embodiment of the present invention, the motor controller includes an inductor which is electrically connected in series with a drive voltage line, and a first capacitor which is electrically connected between a portion between an inverter and the inductor in the drive voltage line and a ground. According to this structure, a drive voltage in the drive voltage line can be smoothed and thus, noise generated in the drive voltage line can be suppressed.

Further, in at least an embodiment of the present invention, the motor controller includes a second capacitor which is electrically connected between a portion on an input side with respect to the first capacitor in the drive voltage line and the ground, and a third capacitor which is electrically connected between the second capacitor and the ground. The common line is electrically connected between the second capacitor and the third capacitor. According to this structure, the neutral point which is electrically connected with the common line is clamped by the second capacitor and the third capacitor and thus, even when a voltage having a relatively large amplitude is generated at the neutral point, the voltage can be smoothed. As a result, noise generated in the motor can be suppressed.

In at least an embodiment of the present invention, when a capacitance of each of the second capacitor and the third capacitor is defined as C1, the C1 satisfies a following conditional expression:

$$\text{"0.047 μF} \leq C1 \leq 0.33 \text{ μF"}.$$

In a case that the capacitance C1 of each of the second capacitor and the third capacitor is smaller than 0.047 μF, a voltage of the neutral point is not sufficiently smoothed and thus, reduction effect of the noise generated in the motor is relatively low. Further, in a case that each capacitance C1 is larger than 0.33 μF, the voltage of the neutral point is excessively smoothed and thus, rotation characteristics of the motor are relatively lowered. As a result, it is difficult to exhibit excellent performance of the motor. Therefore, when the capacitance C1 of each of the second capacitor and the third capacitor satisfies the conditional expression of "0.047 μF≤C1≤0.33 μF", noise generated in the motor 2 can be suppressed without lowering the rotation characteristics of the motor.

In at least an embodiment of the present invention, the second capacitor is electrically connected between a portion on an input side with respect to the inductor in the drive voltage line and the ground. According to this structure, in comparison with a case that the second capacitor is electrically connected between a portion on an output side with respect to the inductor in the drive voltage line and the ground, effect for suppressing noise generated in the motor is large.

In at least an embodiment of the present invention, when a capacitance of the first capacitor is defined as C2, the C2 satisfies a following conditional expression:

$$\text{"100 μF} \leq C2\text{"}.$$

In a case that the capacitance C2 of the first capacitor is smaller than 100 μF, an electric current ripple easily becomes relatively large and a drive voltage of the drive voltage line cannot be sufficiently smoothed. Therefore, it is difficult to effectively suppress noise generated in the drive voltage line. On the other hand, when the capacitance C2 of the first capacitor satisfies the conditional expression of "100 µF≤C2", noise generated in the drive voltage line can be suppressed. Further, an electric current ripple is restrained and thus, the first capacitor does not excessively generate heat. Therefore, characteristics and reliability of the first capacitor can be secured.

In at least an embodiment of the present invention, the motor controller includes a control signal line configured to input the control signal into the motor control part, and a fourth capacitor which is electrically connected between the control signal line and the ground. According to this structure, the control signal transmitted through the control signal line can be smoothed and thus, noise generated in the control signal line can be eliminated.

In at least an embodiment of the present invention, the motor controller includes a ferrite bead which is electrically connected in series with the control signal line in a portion on an input side with respect to the fourth capacitor in the control signal line, and a sixth capacitor which is electrically connected between a portion on an input side with respect to the ferrite bead in the control signal line and the ground. According to this structure, noise generated in the control signal line can be further eliminated.

In at least an embodiment of the present invention, the motor controller includes an FG output line configured to transmit a rotation number signal according to a rotation number of the motor to an external device, and a fifth capacitor which is electrically connected between the FG output line and the ground. According to this structure, the rotation number signal transmitted through the FG output line can be smoothed and thus, noise generated in the FG output line can be eliminated.

In at least an embodiment of the present invention, when a capacitance of the fifth capacitor is defined as C3, the C3 satisfies a following conditional expression:

"C3≤0.1 µF".

In a case that a capacitance C3 of the fifth capacitor 25 is larger than 0.1 µF, although noise generated in the FG output line can be eliminated, an output waveform of a rotation number signal easily becomes relatively dull. Therefore, a rotation number signal of the motor cannot be detected by an external device with a high degree of accuracy and thus, it is difficult to control the motor to a desired rotation number. When a capacitance C3 of the fifth capacitor satisfies the conditional expression of "C3≤0.1 µF", noise generated in the FG output line can be eliminated and the motor can be controlled to a desired rotation number.

A motor in accordance with at least an embodiment of the present invention includes a rotor which is rotatable with a center axis as a center, a stator having a three-phase coil, and the above-mentioned motor controller. According to this structure, noise generated in the motor can be suppressed.

A pump device in accordance with at least an embodiment of the present invention includes the above-mentioned motor, an impeller which is fixed to the rotor, and a case which accommodates the impeller and sections a pump chamber. According to this structure, noise generated from the pump device is suppressed and thus, a precision apparatus used around the pump device is hard to be affected by noise.

Effects of the Invention

According to at least an embodiment of the present invention, a drive voltage in the drive voltage line can be smoothed by the inductor and the first capacitor and thus, noise generated in the drive voltage line can be suppressed. Further, the neutral point which is electrically connected with the common line is clamped by the second capacitor and the third capacitor and thus, even when a voltage having a relatively large amplitude is generated at the neutral point, the voltage can be smoothed. As a result, the motor controller is capable of suppressing noise generated in the motor.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 3A, 3B and 3C are views in which capacitance of a capacitor is compared.

DETAILED DESCRIPTION

Figure 1:
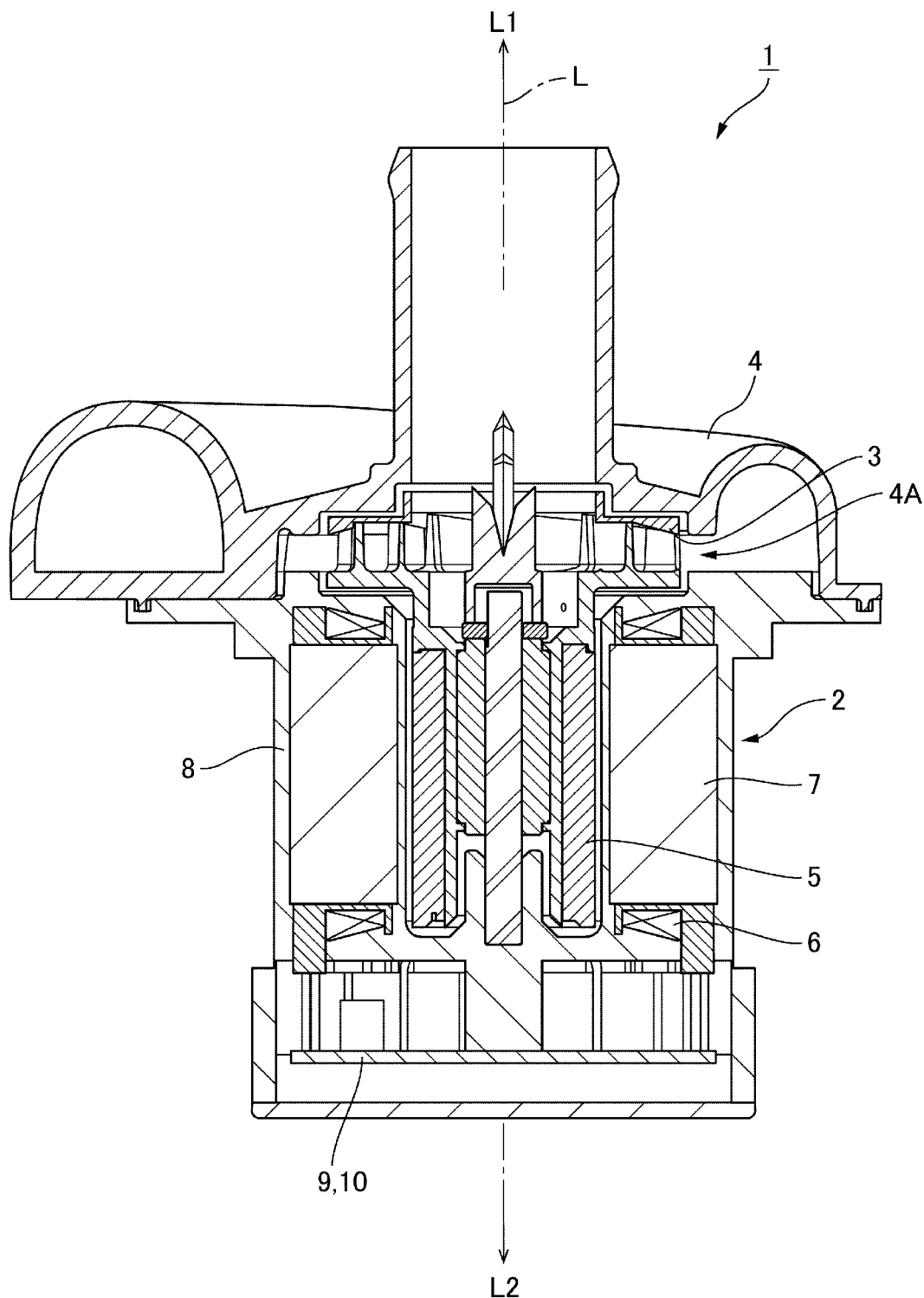
FIG. 1 is an explanatory view schematically showing a cross section of a pump device in accordance with an embodiment of the present invention.

An embodiment of the present invention will be described below with reference to the accompanying drawings. FIG. 1 is an explanatory view schematically showing a cross section of a pump device in accordance with an embodiment of the present invention. As shown in FIG. 1, a pump device 1 includes a motor 2 having a rotor 5 which is turnable with a center axis "L" as a center, an impeller 3 which is fixed to one side "L1" of the center axis "L" with respect to the rotor 5, and a case 4 which accommodates the impeller 3 and sections a pump chamber 4A. The case 4 is attached to the motor 2 from one side "L1" with respect to the motor 2. The pump device 1 moves fluid in an inside of the pump chamber 4A by rotating the impeller 3 together with the rotor 5 with the center axis "L" as a center.

The motor 2 includes the rotor 5 which is turnable with the center axis "L" as a center, a stator 7 having a three-phase coil 6, a resin sealing member 8 which covers the stator 7, and a circuit board 9 which is connected with the three-phase coil 6. The motor 2 is a three-phase motor, and the three-phase coil 6 includes a U-phase coil, a V-phase coil and a W-phase coil. A magnet is provided on an outer peripheral face of the rotor 5.

The circuit board 9 is located on the other side "L2" with respect to the stator 7. A motor controller 10 for controlling the motor 2 is structured on the circuit board 9. The motor controller 10 controls rotation of the motor 2 by controlling power supply to the three-phase coil 6.

Figure 2:
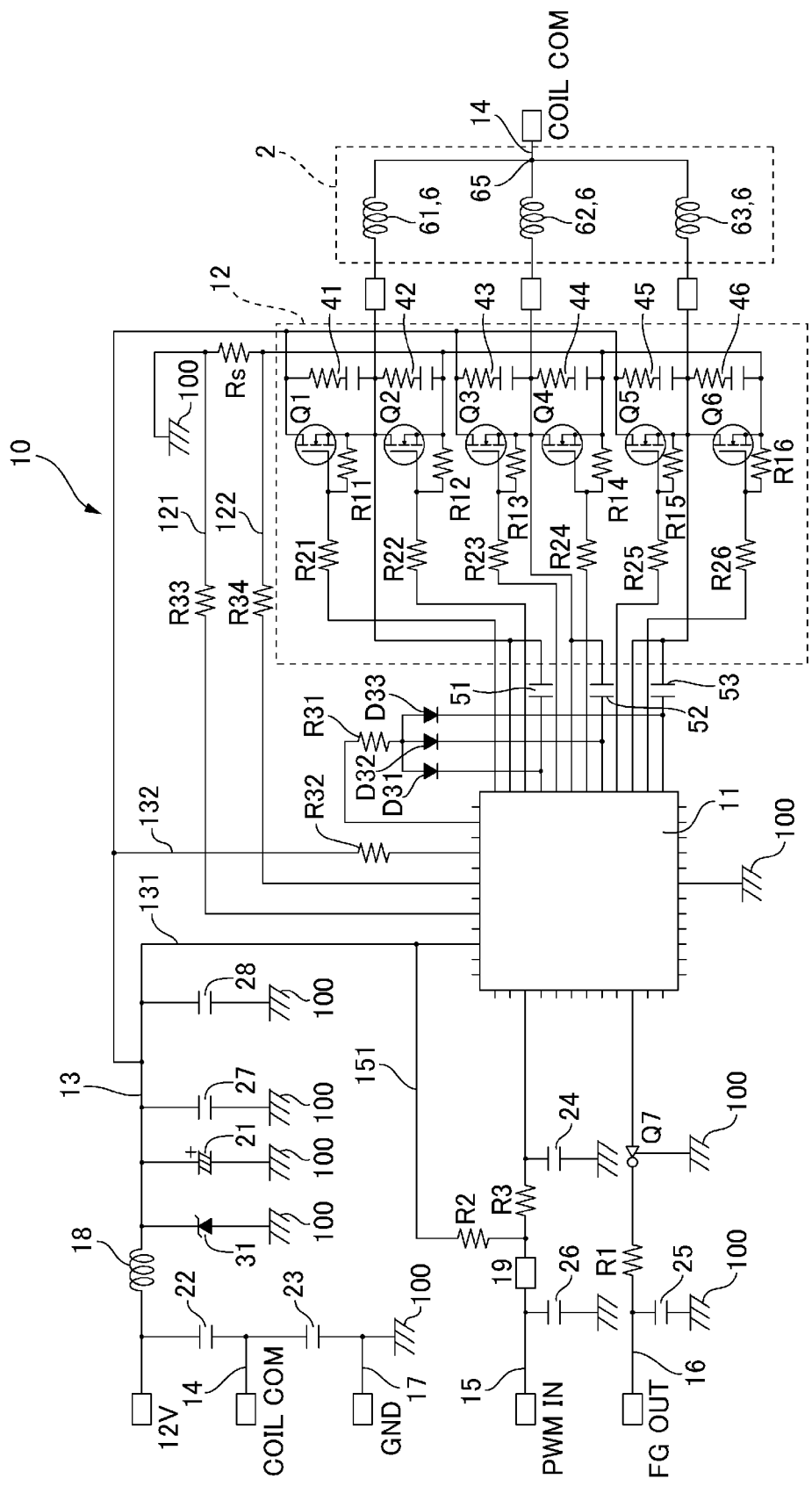
FIG. 2 is a schematic circuit diagram showing a motor controller.

FIG. 2 is a schematic circuit diagram showing the motor controller 10. As shown in FIG. 2, the motor 2 controlled by the motor controller 10 includes a U-phase coil 61, a V-phase coil 62 and a W-phase coil 63. The three-phase coil 6 is star-connected.

The motor controller 10 includes a motor control part 11 configured to control rotation of the motor 2 by a PWM signal, an inverter 12 configured to apply a drive voltage supplied from a driving power source to the three-phase coil 6 based on an output signal from the motor control part 11, a drive voltage line 13 configured to supply the drive voltage to the inverter 12, and a common line 14 connected with a neutral point 65 of the three-phase coil 6. The motor controller 10 includes a control signal line 15 for inputting a PWM signal from an external device into the motor control part 11, and an FG output line 16 for transmitting a rotation number signal according to a rotation number of the motor 2 to the external device.

The motor controller 10 includes an inductor 18, a first capacitor 21, a second capacitor 22, a third capacitor 23, a fourth capacitor 24, a fifth capacitor 25, a sixth capacitor 26 and a ferrite bead 19.

The motor control part 11 is structured of an IC chip or the like disposed on the circuit board 9. The motor control part 11 outputs an output signal for controlling the inverter 12 based on a PWM signal inputted from the external device. Further, the motor control part 11 outputs a rotation number signal according to a rotation number of the rotor 5 to the external device. The external device outputs a PWM signal to the motor control part 11 for setting the motor 2 to a desired rotation number based on the rotation number signal.

The inverter 12 includes switching elements Q1 and Q2 structuring upper and lower arms for the U-phase, switching elements Q3 and Q4 structuring upper and lower arms for the V-phase, and switching elements Q5 and Q6 structuring upper and lower arms for the W-phase. For each of the switching elements Q1 through Q6, for example, a MOS type FET is used.

A drain of the switching element Q1, a drain of the switching element Q3 and a drain of the switching element Q5 are connected with the drive voltage line 13. A source of the switching element Q2, a source of the switching element Q4 and a source of the switching element Q6 are connected with a ground 100 through a shunt resistor Rs. Both ends of the shunt resistor Rs are connected with the motor control part 11 through a resistor R33 in an output line 121 and a resistor R34 in an output line 122.

A source of the switching element Q1 and a drain of the switching element Q2 are connected with the U-phase coil 61 of the three-phase coil 6. A source of the switching element Q3 and a drain of the switching element Q4 are connected with the V-phase coil 62 of the three-phase coil 6. A source of the switching element Q5 and a drain of the switching element Q6 are connected with the W-phase coil 63 of the three-phase coil 6.

A capacitor 51 is connected with the source of the switching element Q1 and the drain of the switching element Q2 on an opposite side to a side where the U-phase coil 61 of the three-phase coil 6 is connected. A capacitor 52 is connected with the source of the switching element Q3 and the drain of the switching element Q4 on an opposite side to a side where the V-phase coil 62 of the three-phase coil 6 is connected. A capacitor 53 is connected with the source of the switching element Q5 and the drain of the switching element Q6 on an opposite side to a side where the W-phase coil 63 of the three-phase coil 6 is connected. The capacitors 51 through 53 are capacitors for charging and discharging of a bootstrap circuit.

Diodes D31 through D33 for bootstrap are respectively connected between the capacitors 51 through 53 and the motor control part 11. The diodes D31 through D33 are connected with the motor control part 11 through a resistor R31.

Resistors R11 through R16 are respectively connected between gates and sources of the respective switching elements Q1 through Q6. Resistors R21 through R26 are respectively connected between the gates of the respective switching elements Q1 through Q6 and the motor control part 11. Filters 41 through 46 are respectively connected between the drains and the sources of the respective switching elements Q1 through Q6. Each of the filters 41 through 46 is structured of a resistor and a capacitor which are connected in series with each other.

The inverter 12 is a circuit in which a drive voltage supplied through the drive voltage line 13 is converted into three-phase AC by switching the respective switching elements Q1 through Q6, and drive voltages of the three-phase AC are supplied to the motor 2 to rotate the rotor 5 of the motor 2. The inverter 12 drives the motor 2 based on output signals outputted from the motor control part 11.

The drive voltage line 13 supplies electric power to the motor control part 11 and the inverter 12. In this embodiment, a voltage of rated 12V is applied to the drive voltage line 13. An inductor 18 and a first capacitor 21 are connected with the drive voltage line 13. The inductor 18 is electrically connected in series with the drive voltage line 13. The first capacitor 21 is electrically connected between a portion between the inverter 12 and the inductor 18 in the drive voltage line 13 and the ground. In this embodiment, a capacitance C2 of the first capacitor 21 is 150 µF.

The drive voltage line 13 is connected with a capacitor 27 and a diode 31. The capacitor 27 is electrically connected between a portion on an output side with respect to the first capacitor 21 in the drive voltage line 13 and the ground 100. The diode 31 is electrically connected between a portion between the inductor 18 and the first capacitor 21 in the drive voltage line 13 and the ground 100.

A first line 131 and a second line 132 are connected with the drive voltage line 13. The first line 131 and the second line 132 are electrically connected with the motor control part 11 to supply electric power to the motor control part 11. The first line 131 is branched on an output side with respect to the capacitor 27 and is electrically connected with the motor control part 11. The first line 131 is connected with a capacitor 28 which is electrically connected with the ground 100. The second line 132 is electrically connected with the motor control part 11 through a resistor R32.

A second capacitor 22 is connected with the drive voltage line 13. The second capacitor 22 is electrically connected between a portion on an input side with respect to the first capacitor 21 in the drive voltage line 13 and the ground. More specifically, the second capacitor 22 is electrically connected between a portion on an input side with respect to the inductor 18 in the drive voltage line 13 and the ground. A third capacitor 23 is electrically connected between the second capacitor 22 and the ground 100. In other words, the second capacitor 22 and the third capacitor 23 are connected in series between the drive voltage line 13 and the ground 100 on an input side with respect to the inductor 18 in the drive voltage line 13. In this embodiment, the second capacitor 22 and the third capacitor 23 are structured of the same capacitor as each other. In other words, a capacitance C1 of the second capacitor 22 and a capacitance C1 of the third capacitor 23 are the same as each other. The capacitance C1 of each of the second capacitor 22 and the third capacitor 23 is 0.1 µF.

In this embodiment, a common line 14 is electrically connected between the second capacitor 22 and the third capacitor 23. In other words, a neutral point 65 electrically connected with the common line 14 is clamped by the second capacitor 22 and the third capacitor 23. Further, a ground line 17 is connected between the third capacitor 23 and the ground 100.

The control signal line 15 transmits a PWM signal from the external device to the motor control part 11. The control signal line 15 is connected with a ferrite bead 19, a fourth capacitor 24, a sixth capacitor 26 and a resistor R3. The fourth capacitor 24 is electrically connected between the control signal line 15 and the ground 100. The ferrite bead 19 is electrically connected in series with the control signal line 15 in a portion on an output side with respect to the fourth capacitor 24 in the control signal line 15. The sixth capacitor 26 is electrically connected between a portion on an output side with respect to the ferrite bead 19 in the control signal line 15 and the ground 100. The resistor R3 is electrically connected in series with the control signal line 15 in a portion on an output side with respect to the sixth capacitor 26 in the control signal line 15.

The control signal line 15 is connected with a third line 151 which is connected with the first line 131. The third line 151 is electrically connected with the control signal line 15 between the ferrite bead 19 and the resistor R3. A resistor R2 is electrically connected in series with the third line 151.

The FG output line 16 transmits a rotation number signal of the motor 2 outputted from the motor control part 11 to the external device. A fifth capacitor 25, a resistor R1 and a NOT-gate Q7 are connected with the FG output line 16. The fifth capacitor 25 is electrically connected between the FG output line 16 and the ground 100. The resistor R1 is electrically connected in series with the FG output line 16 in a portion on an input side with respect to the fifth capacitor 25 in the FG output line 16. The NOT-gate Q7 is electrically connected in series with the FG output line 16 in a portion on an input side with respect to the resistor R1 in the FG output line 16. In this embodiment, a capacitance C3 of the fifth capacitor 25 is 0.047 µF.

(Operations and Effects)

The motor controller 10 in this embodiment includes the inductor 18, which is electrically connected in series with the drive voltage line 13, and the first capacitor 21 which is electrically connected between a portion in the drive voltage line 13 between the inverter 12 and the inductor 18 and the ground 100. According to this structure, a drive voltage in the drive voltage line 13 can be smoothed and thus, noise generated in the drive voltage line 13 can be suppressed.

Further, the motor controller 10 in this embodiment includes the second capacitor 22, which is electrically connected between a portion on an input side with respect to the first capacitor 21 in the drive voltage line 13 and the ground 100, and the third capacitor 23 which is electrically connected between the second capacitor 22 and the ground 100. The common line 14 is electrically connected between the second capacitor 22 and the third capacitor 23. Therefore, the neutral point 65 which is electrically connected with the common line 14 is clamped by the second capacitor 22 and the third capacitor 23 and thus, even when a voltage having a relatively large amplitude is generated at the neutral point 65, the voltage can be smoothed. As a result, noise generated in the motor 2 can be suppressed. Further, the second capacitor 22 is electrically connected between a portion on an input side with respect to the inductor 18 in the drive voltage line 13 and the ground 100 and thus, in comparison with a case that the second capacitor 22 is electrically connected between a portion on an output side with respect to the inductor 18 in the drive voltage line 13 and the ground 100, effect for suppressing noise generated in the motor 2 is large.

The motor controller 10 in this embodiment includes the control signal line 15 for inputting a PWM signal from an external device into the motor control part 11, and the fourth capacitor 24 which is electrically connected between the control signal line 15 and the ground 100. Therefore, the PWM signal transmitted through the control signal line 15 can be smoothed and thus, noise generated in the control signal line 15 can be eliminated. In addition, the motor controller 10 in this embodiment includes, in a portion on an output side with respect to the fourth capacitor 24 in the control signal line 15, the ferrite bead 19 which is electrically connected in series with the control signal line 15, and the sixth capacitor 26 which is electrically connected between a portion on the output side with respect to the ferrite bead 19 in the control signal line 15 and the ground 100. According to this structure, noise generated in the control signal line 15 can be further eliminated.

The motor controller 10 in this embodiment includes the FG output line 16 for transmitting a rotation number signal according to a rotation number of the motor 2 to an external device, and the fifth capacitor 25 which is electrically connected between the FG output line 16 and the ground 100. Therefore, the rotation number signal transmitted through the FG output line 16 can be smoothed and thus, noise generated in the FG output line 16 can be eliminated.

Next, capacitances of the first capacitor 21, the second capacitor 22, the third capacitor 23 and the fifth capacitor 25 will be explained below. FIGS. 3A, 3B and 3C are views in which capacitance of a capacitor is compared.

As shown in FIG. 3A, in a case that a capacitance C2 of the first capacitor 21 is smaller than 100 µF, an electric current ripple easily becomes relatively large and a drive voltage applied to the drive voltage line 13 cannot be sufficiently smoothed. Therefore, it is difficult to effectively suppress noise generated in the drive voltage line 13. In this embodiment, the capacitance C2 of the first capacitor 21 is 150 µF and satisfies "100 µF≤C2" and thus, noise generated in the drive voltage line 13 can be suppressed. Further, an electric current ripple is restrained and thus, the first capacitor 21 does not excessively generate heat. Therefore, characteristics and reliability of the first capacitor 21 can be secured.

As shown in FIG. 3B, in a case that the capacitance C1 of each of the second capacitor 22 and the third capacitor 23 is smaller than 0.047 µF, a voltage of the neutral point is not sufficiently smoothed and thus, reduction effect of the noise generated in the motor 2 is relatively low. Further, in a case that each capacitance C1 is larger than 0.33 µF, the voltage of the neutral point is excessively smoothed and thus, rotation characteristics of the motor 2 are relatively lowered. As a result, it becomes difficult to exhibit excellent performance of the motor 2. Therefore, in this embodiment, the capacitance C1 of each of the second capacitor 22 and the third capacitor 23 is 0.1 µF and satisfies "0.047 µF≤C1≤0.33 µF" and thus, noise generated in the motor 2 can be suppressed without lowering rotation characteristics of the motor 2.

As shown in FIG. 3C, in a case that a capacitance C3 of the fifth capacitor 25 is larger than 0.1 µF, although noise generated in the FG output line 16 can be eliminated, an output waveform of a rotation number signal easily becomes relatively dull. Therefore, a rotation number signal of the motor 2 cannot be detected by an external device with a high degree of accuracy and thus, it is difficult to control the motor 2 to a desired rotation number. Accordingly, in this embodiment, a capacitance C3 of the fifth capacitor 25 is 0.047 µF and satisfies "C3≤0.1 µF" and thus, noise generated in the FG output line 16 can be eliminated and the motor 2 can be controlled to a desired rotation number.

The motor 2 in this embodiment includes the above-mentioned motor controller 10 and thus, noise generated in the motor 2 is suppressed. As a result, in a case that the motor 2 in this embodiment is used in the pump device 1, noise generated from the pump device 1 is suppressed and thus, a precision apparatus used around the pump device 1 is hard to be affected by noise. In the embodiment described above, the motor 2 is used in the pump device 1, but the motor 2 may be used in various applications.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A motor controller which controls a motor having a three-phase coil, the motor controller comprising:
    a motor control part which controls rotation of the motor by a control signal;
    an inverter which applies a drive voltage supplied from a driving power source to the three-phase coil based on an output signal from the motor control part;
    a drive voltage line which supplies the drive voltage to the inverter;
    a common line which is electrically connected with a neutral point of the three-phase coil;
    an inductor which is electrically connected in series with the drive voltage line;
    a first capacitor which is electrically connected between a portion between the inverter and the inductor in the drive voltage line and a ground;
    a second capacitor which is electrically connected between a portion on an input side with respect to the first capacitor in the drive voltage line and the ground; and
    a third capacitor which is electrically connected between the second capacitor and the ground;
    wherein the common line is electrically connected between the second capacitor and the third capacitor.

2. The motor controller according to claim 1, wherein when a capacitance of each of the second capacitor and the third capacitor is defined as C1, the C1 satisfies a following conditional expression:

"$0.047\ \mu F \leq C1 \leq 0.33\ \mu F$".

3. The motor controller according to claim 1, wherein the second capacitor is electrically connected between a portion on an input side with respect to the inductor in the drive voltage line and the ground.

4. The motor controller according to claim 3, wherein the second capacitor is electrically connected between a portion on an input side with respect to the inductor in the drive voltage line and the ground.

5. The motor controller according to claim 4, wherein when a capacitance of the first capacitor is defined as C2, the C2 satisfies a following conditional expression:

"$100\ \mu F \leq C2$".

6. The motor controller according to claim 5, further comprising:
    a control signal line configured to input the control signal into the motor control part, and
    a fourth capacitor which is electrically connected between the control signal line and the ground.

7. The motor controller according to claim 6, further comprising:
    a ferrite bead which is electrically connected in series with the control signal line in a portion on an input side with respect to the fourth capacitor in the control signal line; and
    a sixth capacitor which is electrically connected between a portion on an input side with respect to the ferrite bead in the control signal line and the ground.

8. The motor controller according to claim 6, further comprising:
    an FG output line configured to transmit a rotation number signal according to a rotation number of the motor to an external device; and
    a fifth capacitor which is electrically connected between the FG output line and the ground.

9. The motor controller according to claim 8, wherein when a capacitance of the fifth capacitor is defined as C3, the C3 satisfies a following conditional expression:

"$C3 \leq 0.1\ \mu F$".

10. The motor controller according to claim 1, wherein when a capacitance of the first capacitor is defined as C2, the C2 satisfies a following conditional expression:

"$100\ \mu F \leq C2$".

11. The motor controller according to claim 1, further comprising:
    a control signal line configured to input the control signal into the motor control part, and
    a fourth capacitor which is electrically connected between the control signal line and the ground.

12. The motor controller according to claim 11, further comprising:
    a ferrite bead which is electrically connected in series with the control signal line in a portion on an input side with respect to the fourth capacitor in the control signal line; and
    a sixth capacitor which is electrically connected between a portion on an input side with respect to the ferrite bead in the control signal line and the ground.

13. The motor controller according to claim 1, further comprising:
    an FG output line configured to transmit a rotation number signal according to a rotation number of the motor to an external device; and
    a fifth capacitor which is electrically connected between the FG output line and the ground.

14. The motor controller according to claim 13, wherein when a capacitance of the fifth capacitor is defined as C3, the C3 satisfies a following conditional expression:

"$C3 \leq 0.1\ \mu F$".

15. A motor comprising:
    a rotor which is rotatable with a center axis as a center;
    a stator comprising a three-phase coil; and
    the motor controller defined in claim 1.

16. A pump device comprising:
    the motor defined in claim 15;
    an impeller which is fixed to the rotor; and
    a case which accommodates the impeller and sections a pump chamber.

* * * * *